United States Patent [19]

Hilpert et al.

[11] Patent Number: 4,502,797
[45] Date of Patent: Mar. 5, 1985

[54] ARRANGEMENT FOR PRESSING A PRINT HEAD AGAINST A RECORD CARRIER

[75] Inventors: Fritz W. Hilpert, Boeblingen; Erich Kohm, Schoenaich; Volker Rudolph, Aidlingen; Manfred Wohnsdorf, Boeblingen, all of Fed. Rep. of Germany

[73] Assignee: International Business Machines Corporation, Armonk, N.Y.

[21] Appl. No.: 496,760

[22] Filed: May 20, 1983

[30] Foreign Application Priority Data

Jun. 4, 1982 [EP] European Pat. Off. ........ 82104903.8

[51] Int. Cl.$^3$ ................................................ B41J 3/18
[52] U.S. Cl. ........................................ 400/55; 346/155
[58] Field of Search ................... 400/55, 56, 57, 59; 346/68, 155

[56] References Cited

U.S. PATENT DOCUMENTS

| 3,509,980 | 5/1970 | Loughry et al. | 400/120 |
| 4,010,834 | 3/1977 | Linder | 400/55 |
| 4,090,600 | 5/1978 | Biedermann | 400/56 |
| 4,225,251 | 9/1980 | Klimek et al. | 400/120 |

FOREIGN PATENT DOCUMENTS 2321017 11/1974 Fed. Rep. of Germany ........ 400/56

OTHER PUBLICATIONS

"Thermal Print Head Control"; Perry, J. R.; *IBM Technical Disclosure Bulletin*, vol. 21, No. 4, pp. 1594–1595; Sep. 1978.

*Primary Examiner*—Edgar S. Burr
*Assistant Examiner*—David A. Wiecking
*Attorney, Agent, or Firm*—E. Ronald Coffman

[57] ABSTRACT

Arrangement for a print head having at least one print electrode and being movable relative to a record carrier transported over a support, and pressed down onto the record carrier by the effect of an actuator, where a first frame piece (4) carrying the print electrode (6) supported in a holder (5) is pivotably fixed, via a spring arrangement (2,3) biasing the print head towards the record carrier, to a second frame piece (1) opposite the first frame piece (4), where furthermore an electromagnetic actuator (9, 10) between the two frame pieces is attached to the second frame piece (1) to which a resilient ferromagnetic armature (14) is also fixed and through its greater bias acting against the bias of the spring arrangement (2, 3) abuts against a non-ferromagnetic stop (15) provided at the first frame piece and facing the end of the armature, which thus lifts the print head against the force of the spring arrangement (2, 3), and where by the operation of the actuator (9, 10), the print electrode (6) places itself against the record carrier (7) under the force of the spring arrangement (2, 3).

3 Claims, 2 Drawing Figures

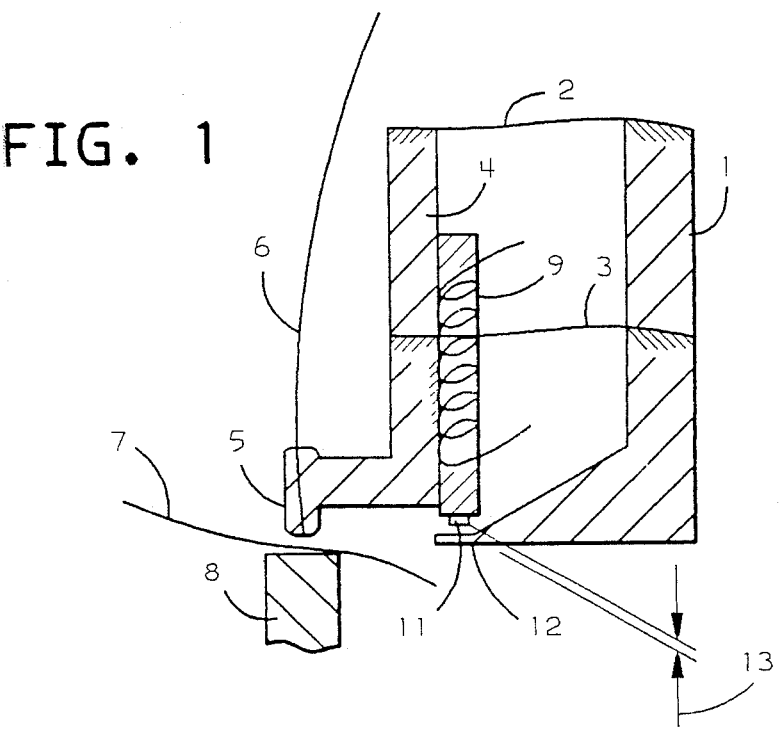
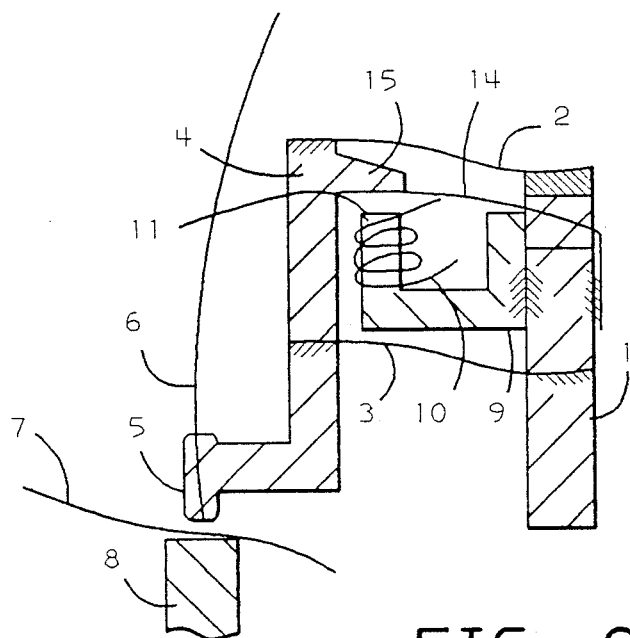

ARRANGEMENT FOR PRESSING A PRINT HEAD AGAINST A RECORD CARRIER

This invention relates to an arrangement for a print head that is equipped with at least one print electrode and movable relative to a record carrier transported over a support, and that can be pressed against the record carrier by an actuator.

In printers such as those operating with electrosensitive paper print heads employed usually include a large number of print electrodes arranged in rows and/or columns, or in the form of a dot matrix. When these print electrodes are selectively energized against the record carrier dot-shaped markings can be made, by evaporation or burn-out arcs. For printing or writing, the print head is pressed against a record carrier carried on a support, such as a printing platen. It is also useful to lift the print head off the record carrier after the writing or printing process to avoid damaging the print electrodes or the record carrier. U.S. Pat. No. 3,509,980 illustrates a thermal-matrix printer in which a print head is movable on a guide rail along a printing line. By rotating the guide rail the print head can be pressed against a heat-sensitive record carrier, or lifted off again when the rail is rotated in the opposite direction; i.e., in each print position the print head is pressed down and lifted again. The mechanical structure required for that purpose is extensive and the pressure obtained is inflexible and rigid.

German Offenlegungsschrift No. 29 00 637 illustrates a similar arrangement for a printer operating with electrosensitive paper, where the print head, which is movable along an axis extending parallel to the printing line, and pivotable round this axis can be lifted from the paper by a spring, and pressed down onto said paper by means of an electromagnet overcoming this spring force. Here, too, the pressure process is rigid and inflexible.

It can thus be concluded quite generally that until now two kinds of pressure biasing devices have been known which both have their specific advantages and disadvantages. In one case, the print head can be pressed down by force of a spring and lifted off by means of an electromagnet. If this electromagnet fails the print head and/or the record carrier can be damaged.

In the second case, the print head can be raised by the force of a spring and pushed down by an electromagnet. However, this requires a precisely adjusted fixed stop for the magnetic armature, since otherwise there will be the same risk of damaging the print head and/or the record carrier if the print head impacts on the record carrier without being decelerated.

It is the object of the invention to provide an arrangement which avoids the described disadvantages. The invention follows an entirely novel path ensuring a soft engagement of the print head against the record carrier with a precisely defined pressure. In the off-state, however, or upon the failure of the electromagnet serving as an actuator, the print head is inoperative.

The object of the present invention is achieved in that a first frame piece carrying the print electrode supported in a holder is pivotably fixed, via a biasing spring arrangement to a second frame piece facing the first frame piece, that furthermore an electromagnetic actuator between the two frame pieces is fixed to the second frame piece to which a resilient ferromagnetic armature is also fixed and through its bias force acting against the bias of the spring arrangement is placed against a non-ferromagnetic stop provided at the first frame piece and facing the end of the armature thus lifts the print head against the force of the spring arrangement. By the operation of the actuator the print electrode is pressed against the record carrier under the force of the spring arrangement.

An embodiment of the invention will now be described in detail with reference to the accompanying drawings.

FIG. 1 shows an arrangement for pressing down a print head in accordance with prior art.

FIG. 2 shows schematically an arrangement for pressing down a print head in accordance with the invention.

FIG. 1 schematically depicts in sectional view the essential part of a print head as used, e.g., in an electro-erosion printer or in a thermal-printer, or in a printer which operates with electrosensitive paper, and which can, e.g., be moved along a printing line. The figure represents a first frame piece 1 with two springs 2 and 3 of a spring arrangement biased in upward direction in the figure. These can, e.g., be leaf springs. Affixed to these leaf springs 2 and 3, another frame piece 4 is provided which at its lower end carries a holder 5 for a printing wire or a print electrode 6 which is to be pressed against a record carrier 7 which in turn is placed on a support 8, e.g., a printing platen. Affixed to frame piece 4, an actuator is provided, in the present case, an electromagnet 9, comprising an excitation coil 10 and at its lower end a pole piece 11 opposite a stationary armature 12. In the present case, the stationary armature is part of frame piece 1.

The distance between pole piece 11 and stationary armature 12 is represented as armature stroke 13. The present arrangement however actually consists of two parallel frames interconnected by two leaf spring arrangements 2 and 3. Although only one printing wire or only one print electrode is shown, it goes without saying that several print electrodes 6 can be provided in holder 5. These print electrodes 6 can be adjusted via a mechanism (not shown), in accordance with their wear by abrasion or burning-off.

In the non-printing state, holder 5 with print electrode 6 is lifted off record carrier 7. If electromagnet 9 is energized by coil 10, the print wire or the print electrode is pressed against record carrier 7 and the support therebeneath which preferably consists of a semi-resilient material. The setting of air gap 13 is not only extremely critical but furthermore cannot follow changed conditions, and this spacing in particular cannot be adapted to changing conditions. In other words, if at the beginning of a printing or writing operation, the pressure exerted by the print head on the record carrier suffices for high print quality, the print quality will deteriorate continuously owing to the burning-off or abrasion of the print electrode during printing. However, if the pressure exerted by the print head against the record carrier is made too high initially, damage to the record carrier and/or the print head can occur.

The invention follows an entirely different path. In FIG. 2, all parts are given the same reference numbers, even if they don't have the same effect in each particular case.

FIG. 2 depicts a frame piece 1 of a print head which again can be moved on a carriage along a printing line. Frame piece 4 is now connected to frame piece 1, via leaf springs 2 and 3 biased in the direction toward the pressing down of the print head.

Frame piece 4 carries at its lower end holder 5 for the printing wire or print electrode 6 which is to be pressed against a record carrier 7 placed on a support 8, e.g., a semi-resilient printing platen. The actuator, i.e., electromagnet 9, is now affixed to frame piece 1 and equipped with a coil 10, and is provided at its upper free end with a pole piece 11.

Unlike the design as shown in FIG. 1, in an embodiment according to the invention shown in FIG. 2, a ferromagnetic leaf spring 14 is now affixed to frame piece 1, that leaf spring representing the armature for the actuator, (in this case electromagnet 9). This leaf spring 14 is biased in an upward direction, and its outer end abuts against a non-ferromagnetic stop 15 provided at the upper end of frame piece 4. The biasing force of leaf spring 14 which in the drawing is upward-directed is greater than the downward-directed forces of leaf springs 2 and 3, with the consequence that, in the stationary or inoperative state, holder 5 or print electrode 6 is lifted off record carrier 7 and support 8. If coil 10 is energized, leaf spring 14 representing the armature is attracted, so that leaf springs 2 and 3 can become effective, and can thus resiliently and with a precisely adjusted pressure, press the print electrodes onto record carrier 7. The considerable advantage of that feature is that it is now possible to operate with a precisely defined pressure that the print electrodes 6 can exert against record carrier 7 moving over a support 8. At the same time, this affords a more uniform pressure and a much less complicated control of the adjusting of the print electrodes to compensate for burn-off or abrasion. The statement made in connection with FIG. 1 is, of course, applicable here, too, i.e., that holder 5 can comprise not only one print electrode 6 but a plurality of print electrodes 6, and that frame pieces 1 and 4 are part of a rectangular frame and are interconnected by two leaf spring pairs 2 and 3. Although in principle, it would be conceivable to provide at each one of the two frame pieces 1 an electromagnet 9, there will generally be only one electromagnet, and stop 15 will be designed as a transversal piece connecting the two frame pieces 4 and 4. It is now quite obvious, too, that stop 15 must not consist of ferromagnetic material. On the other hand, it is possible to use an armature 14 of rigid material attached to a biased spring. An adjusting device can also be provided for a precise adjustment of the upward-directed force of this spring. If electromagnet 9 fails, the print electrodes are now reliably prevented from contacting the record carrier under pressure, so that there will be no damage done to the record carrier or the print electrodes, even if the actuator, electromagnet 9, should break down during operation.

We claim:

1. A support for a print head having an electrode that is movable over a record carrier, wherein the improvement comprises:

a first frame piece, means resiliently connecting the print head to said first frame piece and urging the print head away from the record carrier, said resilient connecting means comprising at least one leaf spring member of magnetizable material and a second spring means, electromagnetic means supportedly connected to said first frame piece between said one leaf spring member and the record carrier and including at least one pole facing said one leaf spring member whereby activation of said electromagnetic means magnetically attracts said one leaf spring member to permit said second spring means to move said print head into pressing engagement with the record carrier.

2. A print head support as defined in claim 1 wherein said second spring means comprises at least an additional pair of leaf springs connected between said first frame piece and said print head, said additional pair of leaf springs being biased to urge the print head toward the record carrier, and said one leaf spring member being biased to urge the print head away from the record carrier with greater force than the bias of said additional pair of leaf springs.

3. A print head support as defined in claim 2 wherein the print head includes a stop surface of non-magnetic material, and wherein said one leaf spring member is connected to the print head by separably abutting said stop surface.

* * * * *